United States Patent [19]

Furumiya et al.

[11] Patent Number: 5,488,593
[45] Date of Patent: Jan. 30, 1996

[54] DISC REPRODUCING METHOD AND APPARATUS WITH MULTIPLE HEADS

[75] Inventors: Shigeru Furumiya; Yoshinari Takemura, both of Osaka, Japan

[73] Assignee: Matsushita Electric Industrial Co., Ltd., Osaka, Japan

[21] Appl. No.: 165,055

[22] Filed: Dec. 10, 1993

[30] Foreign Application Priority Data

Dec. 11, 1992 [JP] Japan .................. 4-331528

[51] Int. Cl.⁶ .................................. G11B 7/00
[52] U.S. Cl. ............... 369/32; 369/50; 369/44.26; 369/58
[58] Field of Search ................. 369/47, 32, 50, 369/44.37, 48, 58, 124, 44.11, 44.26

[56] References Cited

U.S. PATENT DOCUMENTS

| | | | |
|---|---|---|---|
| 4,613,964 | 9/1986 | Ichikawa et al. | 369/44.11 |
| 5,086,419 | 2/1992 | Yanagi | 369/32 |
| 5,111,345 | 5/1992 | Muller | 369/32 |
| 5,148,416 | 9/1992 | Itoshino et al. | 369/32 |
| 5,161,137 | 11/1992 | Suzuki | 369/32 |
| 5,253,242 | 10/1993 | Satoh et al. | 369/47 |
| 5,347,506 | 9/1994 | Matsudo et al. | 369/124 |
| 5,363,364 | 11/1994 | Torazawa et al. | 369/124 |

FOREIGN PATENT DOCUMENTS

| | | |
|---|---|---|
| 0273384 | 7/1988 | European Pat. Off. . |
| 0316084 | 5/1989 | European Pat. Off. . |
| 0487296 | 5/1992 | European Pat. Off. . |
| 0506447 | 9/1992 | European Pat. Off. . |
| 63-161564 | 7/1988 | Japan . |

*Primary Examiner*—Nabil Z. Hindi
*Attorney, Agent, or Firm*—Lowe, Price, LeBlanc & Becker

[57] ABSTRACT

A disc reproducing apparatus for reproducing data stored on plural disc surfaces at a constant linear density comprises: plural heads for reproducing the data on the plural disc surfaces at the same time respectively; a controller for controlling positions of the heads such that a total data rate of data reproduced form the plural heads is constant, each of the disc surfaces being divided into N circumference zones; N signal processing circuits, having N processing speeds corresponding to N data rates corresponding to the N circumference zones, for processing the reproduced data respectively; a switch for supplying the reproduced data to the N signal processing circuits such that data reproduced by each of the plural heads is supplied to any of the N signal processing circuits suitable for the data rate of the supplied data thereto; and a combining circuit for combining the processed data signals from the N signal processing circuits into a combined serial data signal of which data rate corresponds to the total of data rates. A disc reproducing method of reproducing data stored on a plurality of disc surfaces at a constant linear density using N signal processing circuits and the switch is also disclosed.

8 Claims, 4 Drawing Sheets

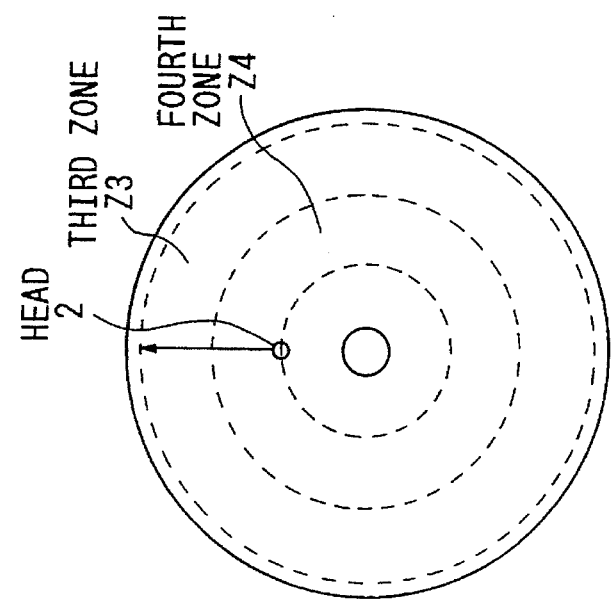
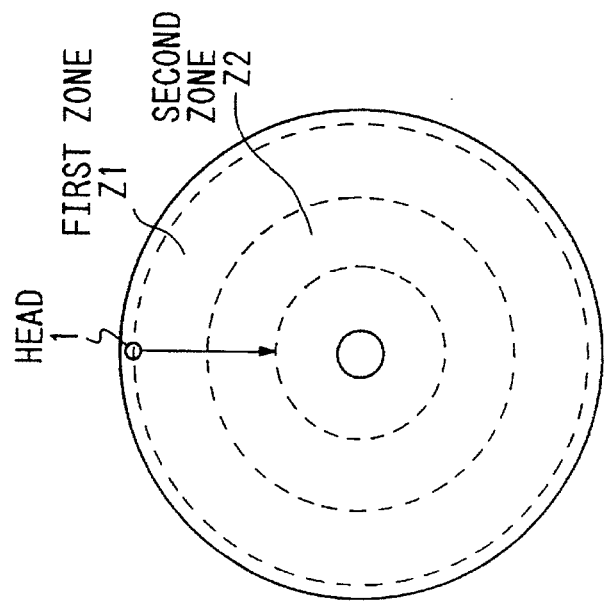

DISC REPRODUCING METHOD AND APPARATUS WITH MULTIPLE HEADS

BACKGROUND OF THE INVENTION

1. Field of the Invention

This invention relates to a reproducing method of reproducing a disc to be reproduced at a constant angular velocity method and a reproducing apparatus for reproducing the disc.

2. Description of the Prior Art

A reproducing method of the modified constant angular velocity (MCAV) is known. This prior art modified constant angular velocity method is as follows:

Data are recorded on a disc at a predetermined data linear density in the circumferential direction of the disc irrespective of a radial position of a track where the data are stored. Since this disc is reproduced at a constant angular velocity (CAV) by rotating the disc at a constant rotational speed, a data rate of the reproduced data changes with the radial position of the reproducing head. Therefore, there is a problem that it is difficult to process the reproduced data with a single processing circuit, such as a waveform equalizing circuit, or a clock reproducing circuit, having a single time constant or single processing speed.

In the modified constant angular velocity method, the data rate varies with the radial position of reproduced data, which is inconvenient for some applications. Another prior art reproducing method of a modification of the modified constant angular velocity method is disclosed in Japanese patent application provisional publication No. 63-161564. This prior art reproducing method reproduces a disc with two heads which respectively access an outer track and an inner track at the same time such that a total data rates of these heads are constant by controlling radial position of the heads and the reproducing circuits.

However, in the above-mentioned reproducing apparatus employing the modified constant angular velocity method, the data rate of the reproduced data for processing circuits thereof also varies with the radial position of the data recorded, so that reproducing circuits must process data signals having data rates varying over a relatively large range. Therefore, waveform equalizing circuits thereof and clock reproducing circuits for bit synchronization, which generally comprises a PLL circuit, require setting of optimum time constants for these circuits. That is, in such a prior art disc reproducing apparatus, the reproducing circuits or the clock reproducing circuits require high performance parts or the trimming of circuit constants to realize these circuits. Moreover, the scale of the reproducing circuit becomes larger.

SUMMARY OF THE INVENTION

The present invention has been developed in order to remove the above-described drawbacks inherent to the conventional disc reproducing method and disc reproducing apparatus.

According to the present invention there is provided a disc reproducing apparatus for reproducing data stored on a plurality of disc surfaces at a constant linear density comprising: a rotating unit for rotating the disc surfaces at a constant rotational speed; a plurality of heads for reproducing the data on the plurality of disc surfaces at the same time respectively; position detectors for detecting positions of the plurality of heads to produce position signals; a position controller for controlling radial positions of the plurality of heads such that a total of data rates of data reproduced by the plurality of heads in accordance with the position signals is constant, each of the disc surfaces being divided into N circumference zones, wherein the N is a natural number; N signal processing circuits for processing the reproduced data respectively, the N signal processing circuits having N processing speeds corresponding to N data rates corresponding to the N circumference zones; a switch circuit for supplying the reproduced data to the N signal processing circuits in accordance with at least one of the position signals such that data reproduced by each of the plurality of heads is supplied to either of the N signal processing circuits corresponding to the either of the N circumference zones at which the each of plurality of heads located; and a combining circuit for combining the processed data signals from the N signal processing circuits into a combined serial data signal of which data rate corresponds to the total of data rates.

According to the present invention there is also provided a disc reproducing method of reproducing data stored on a plurality of disc surfaces at a constant linear density, the plurality of disc surfaces being rotated at a constant rotational speed, comprising the steps of: reproducing the data on the plurality of disc surfaces at the same time with a plurality of heads respectively; detecting positions of the plurality of heads to producing position signals; controlling positions of the plurality of heads such that a total of data rates of data reproduced by the plurality of heads is constant, each of the disc surfaces being divided into N circumference zones, the N data rates corresponding to the N circumference zones wherein the N is a natural number; supplying and processing the reproduced data to N signal processing circuits in accordance with at least one of the position signals such that data reproduced by each of the plurality of head is supplied to either of the N signal processing circuits corresponding to the either of the N circumference zones at which the each of plurality of heads located; and combining the processed data derived from the plurality of heads into a serial data with time-compression.

BRIEF DESCRIPTION OF THE DRAWINGS

The object and features of the present invention will become more readily apparent from the following detailed description taken in conjunction with the accompanying drawings in which:

FIGS. 2A and 2B are illustrations for illustrating an operation of the reproducing apparatus of the first embodiment;

FIG. 3 shows a table for showing conditions of reproducing of a disc by the disc reproducing apparatus of this embodiment;

The same or corresponding elements or parts are designated as like references throughout the drawings.

DETAILED DESCRIPTION OF THE INVENTION

Hereinbelow will be described an embodiment of this invention.

Figure 1:
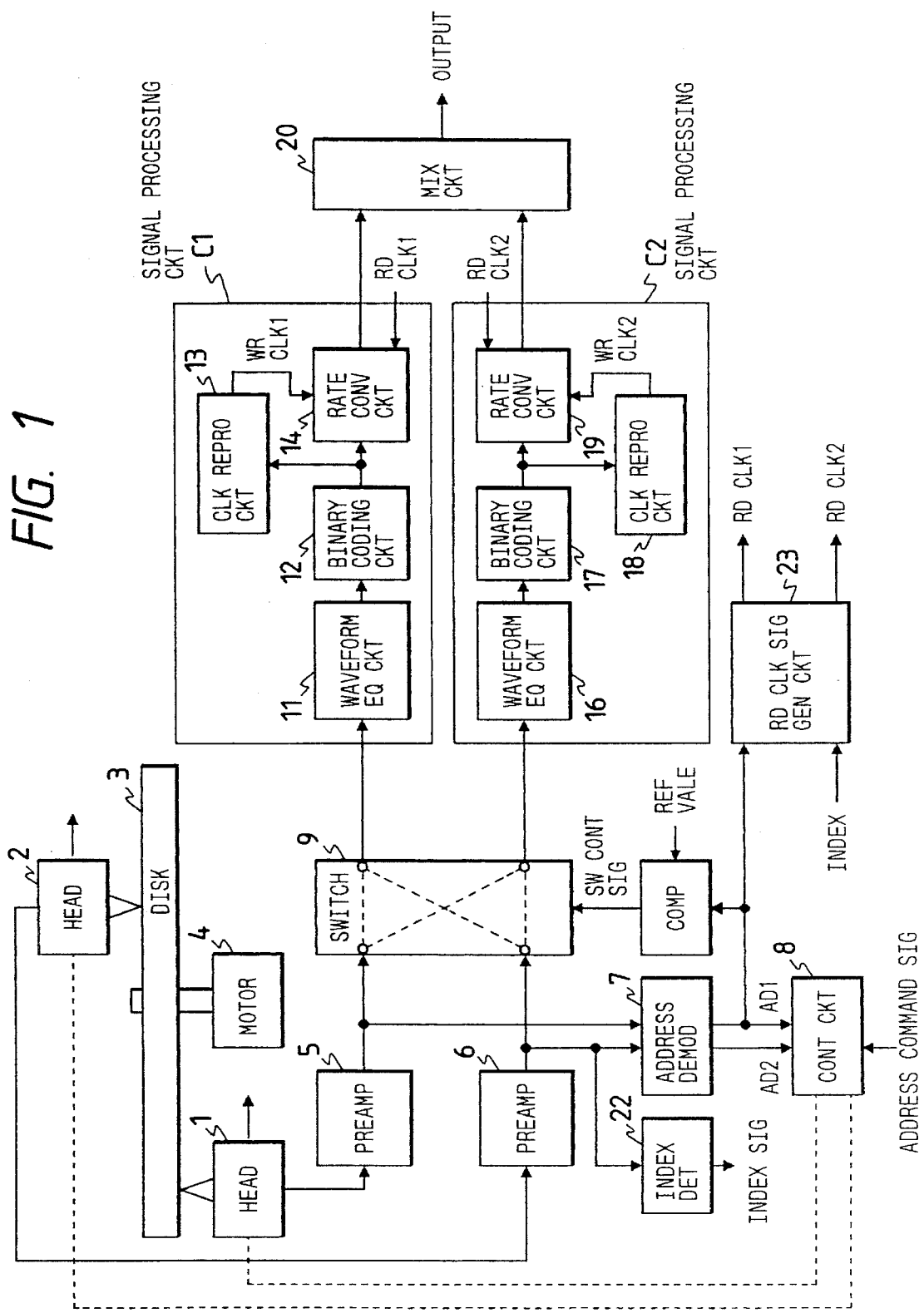
FIG. 1 is a block diagram of the first embodiment of the disc reproducing apparatus of this invention.

FIG. 1 is a block diagram of the embodiment of the disc reproducing apparatus of this invention.

FIGS. 2A and 2B are illustrations for illustrating an operation of the reproducing apparatus of the first embodiment. FIG. 3 shows a table for showing conditions of reproducing of a disc by the disc reproducing apparatus of this embodiment.

A motor 4 rotates a disc 3 at a constant rotational speed. The disc 3 stores data on the front and back surfaces thereof through the modified constant velocity (MCAV) method, that is, data is stored on the disc 3 at a substantially constant data linear density in the circumferential direction of the disc 3 and a total of data rates of the outer track and the corresponding inner track is constant. More specifically, a total amount of data at the outer track and the corresponding inner track is constant. This structure may be provided with that the number of sectors is constant but an amount of data in each of sectors in a track varies with the radial direction of the disc 3. Therefore, a total amount of data in a sector at the most outer track and data in a sector at the most inner track is constant. Similarly, a total amount of data in a sector at the second most outer track and data in a sector at the second most inner track is constant. In this disc reproducing apparatus the disc 3 has four sectors at each track.

A first head 1 reproduces data recorded on the front surface of the disc 3. A second head 2 reproduces data recorded on the back surface of the disc 3. Preamplifiers 5 and 6 amplify reproduced signals from the first and second heads 2 and 3 respectively. An address signal demodulation circuit 7 reproduces address signals from the reproduced data signals from the preamplifiers 5 and 6. A control circuit 8 produces position control signals of the First and second heads 1 and 2 on the basis of the address signals from the address signal demodulation circuit 7. A comparing circuit 21 compares the address signal of the First head from the address demodulator 7 with a reference value to produce a switch control signal. A switch circuit 9 switches signal transferring condition in response to the switch control signal between a first condition that the reproduced data signal from the first head 1 is transferred to a first signal processing circuit e1, and the reproduced data signal from the second head 2 is transferred to a second signal processing circuit c2 and a second condition that the data reproduced from the first head 1 is transferred to the second signal processing circuit c2 and the reproduced signal from the second head 2 is transferred to the first signal processing circuit c1.

An index signal detection circuit 22 detects an index signal recorded on the disk 3 to produce an index signal in response to an output of the preamplifier 6. The index signal is recorded at a start of each sector, so that the index signal is detected at each sector of the disc 3.

The first signal processing circuit c1 processes the reproduced data signal when the reproduced data signal shows a higher data rate. On the other hand, the second signal processing circuit c2 processes the reproduced data signal when the reproduced signal shows a lower data rate. That is, the switch circuit 9 is switched in response to the switch control signal such that either of the reproduced signals having a data rate higher than the other reproduced signal is sent to the first signal processing circuit c1 and the other reproduced data signal is sent to the second signal processing circuit c2.

The signal processing circuit c1 comprises a waveform equalizing circuit 11 for compensating a waveform of the reproduced data signal with the reproducing characteristic of the reproduced data signal compensated, a binary coding circuit 12 for converting the compensated analog reproduced signal into a digital reproduced data signal, a clock signal reproducing circuit 13 for reproducing a bit synchronizing clock signal as a write clock signal WRCLK1 from the digital reproduced data signal, and a rate conversion circuit 14 responsive to a write clock signal WRCLK1 and a read clock signal RDCLK1 for converting the data rate of the digital reproduced data signal to a converted digital signal whose data rate is converted to a constant value by converting the time base of the reproduced digital signal with a memory included therein. The signal processing circuit c2 has the same structure as the signal processing circuit c1, i.e., it comprises a waveform equalizing circuit 16 for compensating the reproduced signal with the reproducing characteristic compensated, a binary coding circuit 17 for converting the compensated analog reproduced signal into a digital reproduced data signal, a clock signal reproducing circuit 18 for reproducing another bit synchronizing clock signal as a write clock signal WRCLK2 from the digital reproduced data signal, and a rate conversion circuit 19 responsive to the write clock signal WRCLK2 and a read clock signal RDCLK2 for converting the data rate of the digital reproduced data signal to a converted digital signal whose data rate is converted to a constant value by converting the time base of the reproduced digital signal with a memory included therein. A read clock signal generation circuit 23 generates the read clock signals RDCLK1 and RDCLK2 in response to the address signal AD1 and the index signal. A mixing circuit 20 mixes the converted digital signal from the signal processing circuit c1 with that from the signal processing circuit c2. The mixing circuit may comprise an OR gate.

The control circuit 8 produces the position control signals for the first head 1 and the second head 2 in accordance with the address signals from the address signal demodulation circuit 7 such that the first head 1 moves in an inward radial direction of the disc 3 and the second head 2 moves in an outward radial direction with the motion of the first head 1. That is, both heads 1 and 2 move in the rightward direction in the drawing as data are reproduced. The comparing circuit 21 produces the switch control signal as follows:

The comparing circuit 21 produces the switch control signal indicative of the first transmission condition while the first head 1 reproduces data at the first zone z1 shown in FIG. 2A. That is, the switch circuit 9 transfers the reproduced data signal from the first head 1 to the signal processing circuit c1 and the reproduced data from the second head 2 which has a lower data rate to the signal processing circuit c2. More specifically, the comparing circuit 21 compares the address signal from the address signal demodulation circuit 7 with the reference value and produces the switch control signal indicative of the first condition when the address is smaller than the reference value.

As shown in FIG. 2A and 2B, as the first head 1 accesses tracks on the front surface of the disc 3 from the outside to the inside of the disc 3 in the radial direction, the second head 2 accesses tracks on the back surface of the disc 3 from the inside to the outside of the disc 3 in The radial direction. Since a data linear density of the data recorded on the disc 3 through the modified angular velocity method is constant, the data recorded at an outer track is reproduced with a higher data rate when the disc is rotated at the constant speed. On the other hand, the data recorded at an inner track is reproduced with a lower data rate. However, the total of the data rates of the reproduced data by the first and second heads 1 and 2 is made constant by causing the first and second heads to access an outer track and an inner tracks at the same time respectively and to move the first and second heads 1 and 2 in the opposite radial directions each other. Moreover, the disc is reproduced with data region of the front and back surfaces of the disc 3 divided into four zones z1 to z4. The first and third zones z1 and z3 are categorized into a high data rate zone and the second and fourth zones z2 and z4 are categorized into a low data rate zone. While the first head 1 reproduces data at the first zone z1, the second head 2 reproduces data at the fourth zone z4. While the first head 1 reproduces data at the second zone z2, the second head 2 reproduces data at the third zone z3. Each of the heads 1 and 2 reproduces data at a zone where data having a different data rate. The switch 9 transfers the reproduced signal from the either of first and second heads having a high data rate, i.e., data reproduced from the either of the first or third zone z1 or z3, to the signal processing circuit c1. On the other hand, the switch 9 transfers the reproduced signal from the either of first and second heads having a low data rate, i.e., data reproduced from the either of the second or fourth zone z2 or z4, to the signal processing circuit c2.

When an address command signal for accessing to a desired address is supplied to the control circuit 8, the control circuit 8 controls the positions of the first and second heads 1 and 2 in accordance with address indicated by the address command signal with reference to the demodulated address signals from the address demodulator 7 in the similar manner to the head controlling disclosed in Japanese patent application provisional publication No. 63-161564. That is, the control circuit causes the first and second heads to access tracks on the front surface and the back surface such that a total data rate is constant.

When the first head 1 reproduces data at a zone of the high data rate zones, the reproduced data is transferred to the signal processing circuit c1 which has a performance suited for processing a signal having a relatively high data rate. On the other hand, when the second head 2 reproduces data at a zone of the low data rate zones, the reproduced data is transferred to the signal processing circuit c2 which has a performance suited for processing a signal having a relatively low data rate.

When the first head 1 reproduces data at a zone of the low data rate zones, the reproduced data is transferred to the signal processing circuit c2. On the other hand, when the second head 2 reproduces data at a zone of the high data rate zones, the reproduced data is transferred to the signal processing circuit c1.

FIG. 8 shows a table for showing a relation between the zones z1 to z4 and the signal processing circuits c1 and c2 to be used in accordance with the zones z1 to z4.

The mixing circuit 20 mixes the output of the rate conversion circuit 14 with an output of the rate conversion circuit 19 to produce an output signal having a constant data rate.

Figure 4:
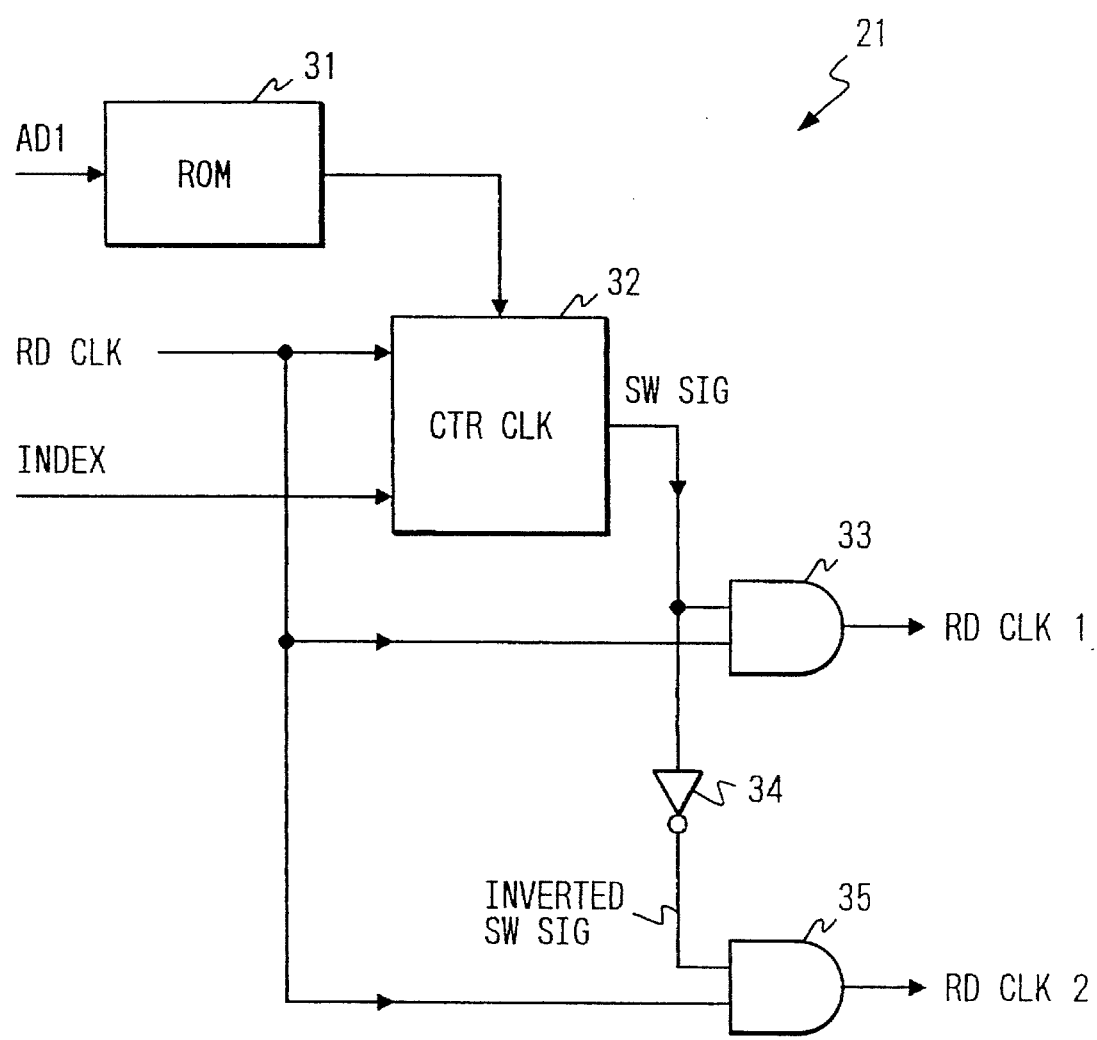
FIG. 4 is a block diagram of a read clock signal generation circuit shown in FIG. 1.

FIG. 4 is a block diagram of a read clock signal generation circuit shown in FIG. 1.

The read clock signal generation circuit 23 comprises a ROM for outputting a data signal indicative of an amount of data per sector of the disc 3 at a track in accordance with the address signal AD1, a counter circuit 32 responsive to the data signal, the index signal, and a read clock for producing a switching signal indicative of a first interval for outputting data reproduced from the outer zones z1 and z3 and a second interval for outputting data reproduced from the inner zones z2 and z4, an AND gate 33 responsive to the switching signal and the read clock for producing the read clock RDCLK1, an inverter 34 for inverting the switching signal, and an AND gate 35 responsive to the switching signal and the read clock for producing the read clock RDCLK2.

The ROM 31 stores first conversion data representing the amount of data per sector at the first zone z1 and second conversion data representing the amount of data per sector at the third zone z3. The amount of data varies with the track on which the first head 1 is located. The amount of data for the third zone z3 is also produced form the address signal AD1 because the second head is determined by the position of the fist head. Therefore, while the first head 1 is located at the first zone z1, the reproduced signal is outputted for the first interval but while the first head 1 is located at the second zone z2, the data signal reproduced from the second head 2 is outputted For the first interval. The read clock has a predetermined frequency determined by the total data rate.

Figure 5:
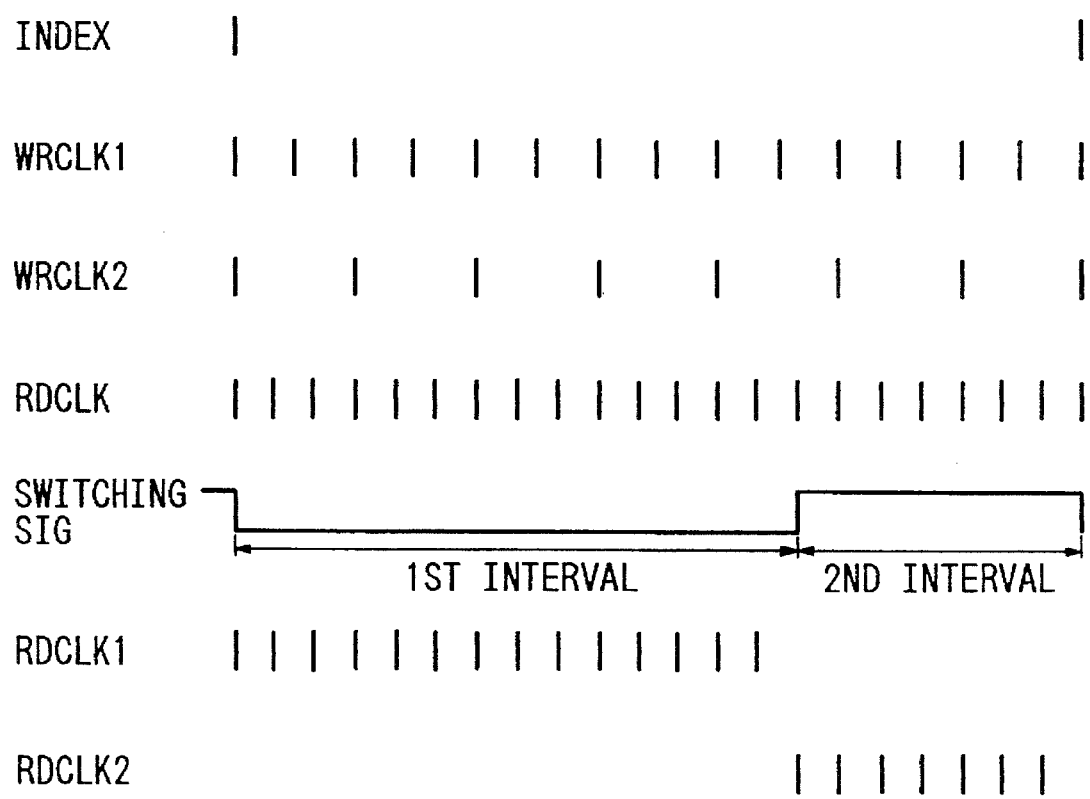
FIG. 5 shows example waveforms at respective points of the read clock signal generation circuit 23 shown in FIG. 1.

FIG. 5 shows example waveforms at respective points of the read clock signal generation circuit 28 shown in FIG. 1.

The ROM 81 stores the first and second conversion data for converting the address signal AD1 to the amount of the data per a sector of the disc 3 as mentioned above. The data signal indicative of the amount of the data per rotation of the disc 3 is supplied to the counter circuit 32. The index signal sets and starts the data signal to the counter circuit 32. The counter circuit counts the read clock RDCLK in response to the index signal until a count agrees with the data signal to produce the switching signal as shown in FIG. 5. The switching signal and an inverted switching signal from the inverter 34 are supplied to the AND gates 88 and 85. The AND gate 33 outputs the read clock RDCLK1 for the first interval and the AND gate 3S outputs the read clock RDCLK2 for the second interval.

As shown in FIG. 5, the rate conversion circuits 14 and 19 store data reproduced from either of the high data rate zones and either of the low data rate zones in response to the write clock WRCLK1 and write clock WRCLK2 reproduced by the clock reproduction circuits 13 and 18 respectively during reproduction of one sector of the disc 3. In the reproduction of the following sector of disc 3, the stored data in the rate conversion circuit 14 is read for the first interval in response to the read clock RDCLK1 and the stored data in the rate conversion circuit 19 is read for the second interval in response to the read clock RDCLK2. Frequency of the read clocks RDCLK1 and RDCLK2 is determined by the total data rate. Therefore, the reproduced data from the high data rate zone and the reproduced data from the low data rate zone are time-divided and time-compressed. The mixing circuit combines the time-divided-and-time-compressed data from the processing circuits c1 and c2 into a serial data as the output.

More specifically, the read clock signal generation circuit 23, the rate conversion circuits (memory circuits) 14 and 19, and the mixing circuit 20 forms a combining means. That is, the combining means comprises N memory circuits 14 and 19 for storing said reproduced data for producing N time-divided-and-time-compressed serial data signals at each predetermined interval, and for combining said N time-divided-and time-compressed serial data signals into said combined serial data signal.

In the above-mentioned read clock signal generation circuit, the order of the data outputted from the front surface and the back surface included in the output signal during one rotation of the disc 3 is inverted between the first zone z1 and the second zone z2. However, this order can be made without inversion using the switch control signal.

As mentioned above, according to this invention, in the reproduction apparatus for reproducing a disc recorded through the modified constant angular velocity, though each of heads 1 and 2 accesses from the most inner track to the most outer track having different data rates, the signal processing circuits c1 and c2 should not cover all data rates over the disc 3. That is, the signal processing circuit c1 should cover only higher half of the range of data rate of the reproduced signal and the signal processing circuit c2 should cover only lower half of the range of data rate of the reproduced signal. Therefore, the circuit structures of the processing circuits c1 and c2 become simple.

In the above mentioned embodiment, the number of the zones of the disc 3 is four. However, the number of the zones may be changed. The number of the zones is determined by the number of the signal processing circuits provided. The switch circuit 9 and the comparing circuit 21 are also modified in accordance with the number of the signal processing circuits. In the above mentioned embodiment, data is simultaneously reproduced from the single disc 3 having front and back surfaces for recording. However, the number of the disc 3 may be plural. Further, the number of the heads may be increased.

What is claimed is:

1. A disc reproducing apparatus for reproducing data stored on a plurality of disc surfaces at a constant linear density comprising:

(a) rotating means for rotating said disc surfaces at a constant rotational speed;

(b) a plurality of heads for reproducing said data on said plurality of disc surfaces at the same time respectively;

(c) position detection means for detecting positions of said plurality of heads to produce position signals;

(d) position control means for controlling radial positions of said plurality of heads such that a total of data rates of data reproduced by said plurality of heads in accordance with said position signals is constant, each of said disc surfaces being divided into N circumference zones, wherein said N is a natural number;

(e) N signal processing circuits for processing said reproduced data respectively, said N signal processing circuits having N processing speeds corresponding to N data rate ranges corresponding to said N circumference zones;

(f) switch means for supplying said reproduced data to said N signal processing circuits in accordance with at least one of said position signals such that data reproduced by each of said plurality of heads is supplied to a respective one of said N signal processing circuits corresponding to a respective one of said N circumference zones at which said each of plurality of heads is located; and (g) combining means for combining said processed data signals from said N signal processing circuits into a combined serial data signal of which data rate corresponds to said total of data rates.

2. A disc reproducing apparatus as claimed in claim 1, wherein each of said N signal processing circuits comprises a waveform equalization circuit, having a predetermined time constant, for waveform-equalizing said reproduced data.

3. A disc reproducing apparatuses claimed in claim 1, wherein each of said N signal processing circuits comprises a clock signal reproducing circuit, having a predetermined time constant, for reproducing a clock signal from said reproduced data supplied thereto.

4. A disc reproducing apparatus as claimed in claim 1, wherein said combining means comprises N memory circuits for storing said processed reproduced data for producing N time-divided-and-time-compressed serial data signals at each predetermined interval, and for combining said N time-divided-and time-compressed serial data signals into said combined serial data signal.

5. A disc reproducing apparatus as claimed in claim 1, wherein said N signal processing circuits have N respective processing speeds, different from each other, for processing data provided at N different data rate ranges from said N corresponding circumference zones.

6. A disc reproducing apparatus as claimed in claim 1, wherein said position control means is responsive to a control signal for moving at least a first head from a first circumference zone having a lower data rate to a second circumference zone having a higher data rate while moving a second head from a circumference zone having a higher data rate to another circumference zone having a lower data rate, and said switch means comprises means responsive to said control signal for switching a reproduced data output of said first head from a first signal processing circuit having a lower processing speed to a second signal processing circuit having a higher processing speed.

7. A disc reproducing apparatus as claimed in claim 1, wherein each of said N signal processing circuit comprises a respective clock signal reproducing circuit for reproducing a bit synchronizing clock signal as a respective write clock signal and a rate conversion circuit responsive thereto and to a respective read clock signal for converting a data rate of the reproduced data by converting a time base of the reproduced data.

8. A disc reproducing apparatus as claimed in claim 7, further comprising a read clock signal generation circuit responsive to an address signal and a sector signal recorded at each sector on the disc for generating a plurality of read clock signals respectively corresponding to each of said N signal processing circuits.

* * * * *